United States Patent
Chen et al.

(10) Patent No.: US 10,800,426 B2
(45) Date of Patent: Oct. 13, 2020

(54) WARNING DEVICE FOR ADJUSTING WARNING SENSITIVITY OF A MOVABLE DEVICE AND METHOD OF ADJUSTING WARNING SENSITIVITY THEREOF

(71) Applicant: J-MEX Inc., Hsinchu (TW)

(72) Inventors: Chi-Hung Chen, Hsinchu (TW); Shang-Po Yeh, Hsinchu (TW)

(73) Assignee: J-MEX, INC., Hsinchu (TW)

( * ) Notice: Subject to any disclaimer, the term of this patent is extended or adjusted under 35 U.S.C. 154(b) by 0 days.

(21) Appl. No.: 16/382,360

(22) Filed: Apr. 12, 2019

(65) Prior Publication Data
US 2019/0329703 A1    Oct. 31, 2019

(30) Foreign Application Priority Data
Apr. 30, 2018  (TW) .............................. 107114752 A

(51) Int. Cl.
*B60W 40/10*  (2012.01)
*B60W 40/107*  (2012.01)
*B60W 40/13*  (2012.01)

(52) U.S. Cl.
CPC .......... *B60W 40/10* (2013.01); *B60W 40/107* (2013.01); *B60W 40/13* (2013.01); *B60W 2300/36* (2013.01); *B60W 2520/105* (2013.01)

(58) Field of Classification Search
CPC ............. B60W 40/10; B60W 40/1005; B60W 40/107; B60W 40/108; B60W 40/109; B60W 40/11; B60W 40/112; B60W 2300/36; B60W 2300/365; B60W 2300/367; B60W 2520/00; B60W 2520/10; B60W 2520/105; B60W 2520/12; B60W 2520/28; B60W 40/13; B60C 23/061; B60C 23/062
See application file for complete search history.

(56) References Cited

U.S. PATENT DOCUMENTS

| | | | | |
|---|---|---|---|---|
| 8,862,422 | B2 * | 10/2014 | Ikkink | G01P 15/0891 |
| | | | | 702/104 |
| 10,119,985 | B2 * | 11/2018 | Zwegers | G01P 3/486 |
| 2005/0219058 | A1 * | 10/2005 | Katagiri | G08B 21/06 |
| | | | | 340/575 |
| 2015/0084762 | A1 * | 3/2015 | Okada | G08B 21/182 |
| | | | | 340/441 |

FOREIGN PATENT DOCUMENTS

CN          20151088632 A       3/2016

* cited by examiner

*Primary Examiner* — Van T Trieu
(74) *Attorney, Agent, or Firm* — Haverstock & Owens LLP

(57) ABSTRACT

A method for adjusting a warning sensitivity of a movable device having a movement includes the following steps: The movement of the movable device is sensed to generate a plurality of acceleration data associated with a motion identification of the movement. The plurality of acceleration data is sampled to obtain a plurality of parameters within a specific sampling interval. Each of the plurality of parameters is compared with a first pre-determined threshold value to generate a first result; and adjusting a second pre-determined threshold value reflecting the warning sensitivity based on the first result.

20 Claims, 5 Drawing Sheets

WARNING DEVICE FOR ADJUSTING WARNING SENSITIVITY OF A MOVABLE DEVICE AND METHOD OF ADJUSTING WARNING SENSITIVITY THEREOF

CROSS REFERENCE TO RELATED APPLICATION

This application claims the benefit of Taiwan's Patent Application No. 107114752, filed on Apr. 30, 2018, at Taiwan's Intellectual Property Office, the disclosures of which are incorporated herein in their entirety by reference.

TECHNICAL FIELD

Embodiments in the present disclosure are related to a warning device, and more particularly to a warning device for adjusting warning sensitivity of a movable device and a method of adjusting the warning sensitivity of the movable device.

BACKGROUND

Since the industrial revolution, the pace of life has become more rapid and the workload has become heavier. For office workers especially, the long hours do not allow them the chance to exercise, causing people to have a sedentary lifestyle. In addition, those who eat high calorie food every day have nutritional imbalances, and are more likely to have high blood pressure, high cholesterol, diabetes, obesity and other chronic diseases. Cancer rates have risen even in many modern countries because of the above-mentioned factors.

Riding a bicycle can not only save energy and reduce carbon emissions, but also can be a way to improve physical fitness. While slowly pedaling along beautiful scenery, one not only gets necessary exercise but also relief from work pressure and a positive mental effect. However, there are some things to consider while riding a bicycle. For example, a safety warning device is a very useful tool to have because it will indicate to the rider to slow down or stop when in proximity to other vehicles. Especially at night, if there are no warning devices such as car lights to see, a bicycle rider may easily collide with a vehicle in front.

In the prior art, most of the brake lights are mounted on the brake device. The brake wire of the brake device passes through the clamp of the brake light, wherein the clamp has a compression spring. When the brake unit is pressed, the brake wire is compressed to compress the compression spring. In response to the mechanical compression force, the brake light is turned on. After the brake unit is released, the brake wire is stretched to restore the original shape of the compression spring, and the brake light is extinguished.

Another type of brake light has an acceleration sensor built therein and is installed behind the bicycle seat. When the cyclist brakes, the acceleration sensor senses whether the bicycle decelerates, i.e., the acceleration is negative, and the brake light will light up. Otherwise, the acceleration sensor senses the bicycle is maintaining its speed or accelerating, i.e., when the acceleration of the bicycle is not less than zero, the brake light will not light up.

However, when the bicycle moves slowly and the cyclist thereof brakes gently, the acceleration sensor can hardly sense that the movement of the bicycle is performing deceleration. Therefore, there is need for the development of a warning device in a movable device for gentle deceleration and a method of adjusting the warning sensitivity of the movable device having a movement.

SUMMARY OF EXEMPLARY EMBODIMENTS

The object of the present application is to provide a warning device of a movable device for a gentle deceleration. The warning device is installed on the movable device in order to indicate a motion state of the movable device. For example, if the acceleration is negative, it shows that the motion state of the movable device decelerates. The warning device has a warning sensitivity reflecting the motion state and is dynamically adjusted in response to a terrain change experienced by the movable device (for example, the degree of ground jolt). The warning device includes a sensing unit, a data processing unit and a motion analyzing unit. The sensing unit functions as an accelerometer used for sensing the motion state of the movable device to generate a plurality of acceleration signals. The data processing unit receives the plurality of acceleration signals to transform the plurality of acceleration signals into a plurality of acceleration data. The motion analyzing unit identifies maximum acceleration data and minimum acceleration data from the plurality of acceleration data for every sampling interval, in order to form two acceleration sequences. The motion analyzing unit then applies a weighted-average algorithm to the two acceleration sequences to form smooth acceleration sequences respectively corresponding to the two acceleration sequences. The motion analyzing unit subtracts a plurality of a second acceleration values from a plurality of a first acceleration values one by one in real time in order to form a plurality of vibration values associated with different road surface states. The motion analyzing unit compares each vibration value with a predetermined threshold value to decide whether the sensitivity should be adjusted in real time. For example, under a condition that the movable device slowly moves along a relatively smooth surface or less bumpy ground and each vibration value is smaller than the predetermined threshold value, the motion analyzing unit adjusts the warning sensitivity to make the plurality of acceleration signals more easily trigger the warning device, for example by lighting up the warning device. The data processing unit and the motion analyzing unit have a processing unit, which can run functions to make the data processing unit process acceleration data according to different programs or different algorithms, and to make the motion analyzing unit decide whether the predetermined threshold value should be adjusted or to decide whether braking is being performed, so that a control signal is sent to light up the brake light.

In accordance with one embodiment of the present disclosure, a warning device for adjusting a warning sensitivity of a movable device having a movement is disclosed, which comprises a sensing unit, a data processing unit and a motion analyzing unit. The sensing unit senses the movement of the moveable device to generate a plurality of acceleration data associated with a motion identification of the movement. The data processing unit is electrically connected to the sensing unit, and samples the plurality of acceleration data to obtain a plurality of parameters within a specific sampling interval. The motion analyzing unit is electrically connected to the data processing unit, compares each of the plurality of parameters with a first pre-determined threshold value to generate a first result, and adjusts a second pre-determined threshold value reflecting the warning sensitivity based on the first result In accordance with one embodiment of the present disclosure, a method for adjusting a warning sensitivity of a movable device having a movement is disclosed, comprising steps of: providing a motion-weighted algorithm; sensing the movement of the movable device to generate a plurality of acceleration data for a motion identification of the movement; sampling a maximum acceleration value and a minimum acceleration value from the plurality of acceleration data within a specific sampling interval, and calculating a plurality of maximum acceleration weighted-average values and a plurality of minimum acceleration weighted-average values based on the motion-weighted algorithm in order to obtain a plurality of weighted-average value differences; and obtaining a plurality of vibration values based on the plurality of weighted-average value differences, comparing each of the plurality of vibration values with a first pre-determined threshold value to generate a first result, and adjusting a second pre-determined threshold value reflecting the warning sensitivity based on the first result.

In accordance with a further embodiment of the present disclosure, a method for adjusting a warning sensitivity of a movable device having a movement is disclosed, comprising steps of: sensing the movement of the movable device to generate a plurality of acceleration data associated with a motion identification of the movement; sampling the plurality of acceleration data to obtain a plurality of parameters within a specific sampling interval; comparing each of the plurality of parameters with a first pre-determined threshold value to generate a first result; and adjusting a second pre-determined threshold value reflecting the warning sensitivity based on the first result.

The present disclosure provides a warning device for adjusting warning sensitivity of a movable device and a method of adjusting the warning sensitivity of the movable device, the warning sensitivity of the warning device can be dynamically adjusted according to a jolting condition of the road surface, so that the warning device more accurately emits the warning signal. This is especially the case when the road surface is relatively smooth, and the braking is performed gently.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Please refer to all Figures of the present invention when reading the following detailed description, wherein all Figs. of the present invention demonstrate different embodiments of the present invention by showing examples, and help the skilled person in the art to understand how to implement the present invention. However, the practical arrangements and the present method provided to implement the present invention is not necessary to completely comply with the descriptions in the specification. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1:
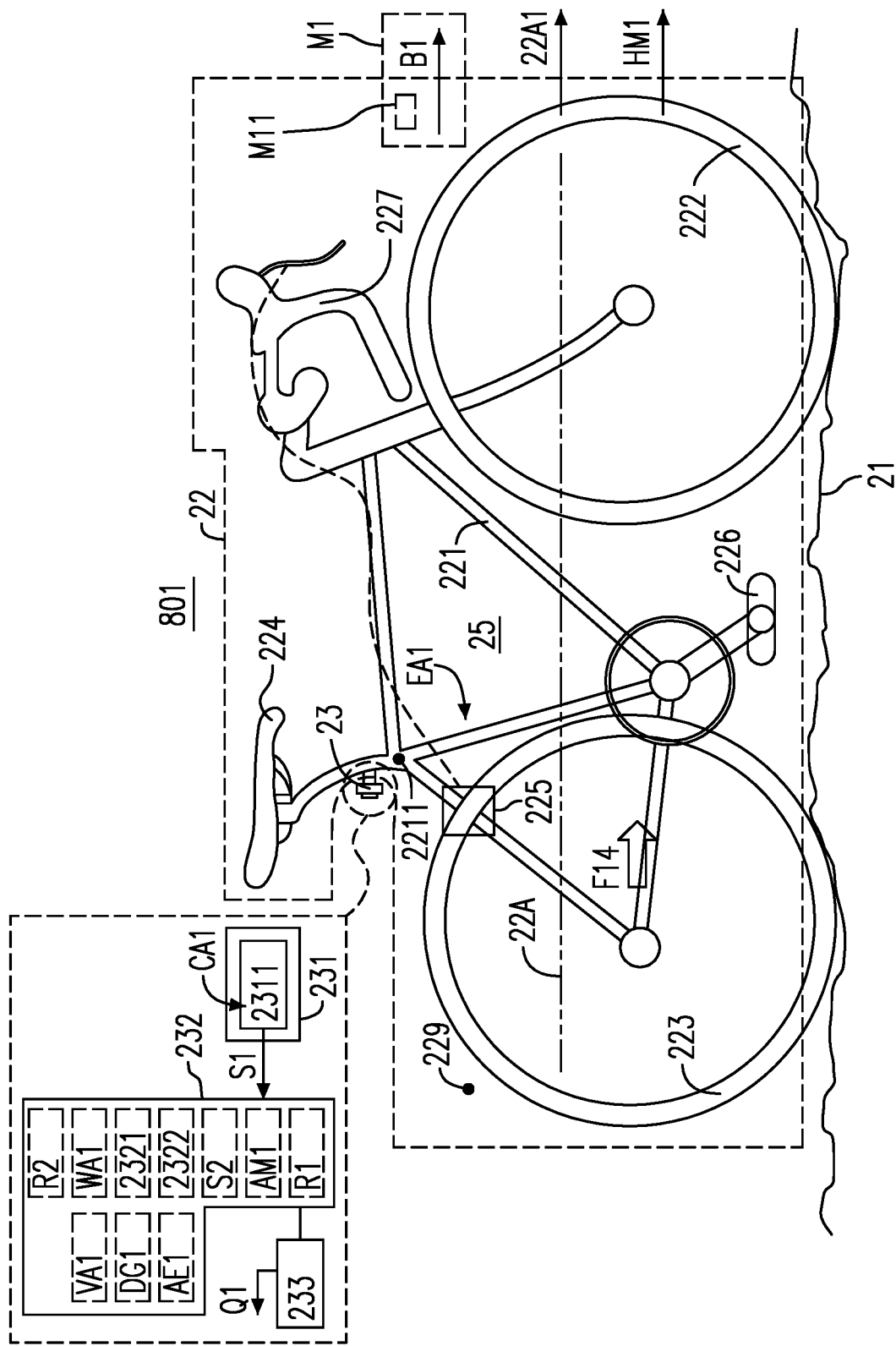
FIG. 1 is a schematic diagram showing a motion system according to various embodiments of the present disclosure.
Figure 2:
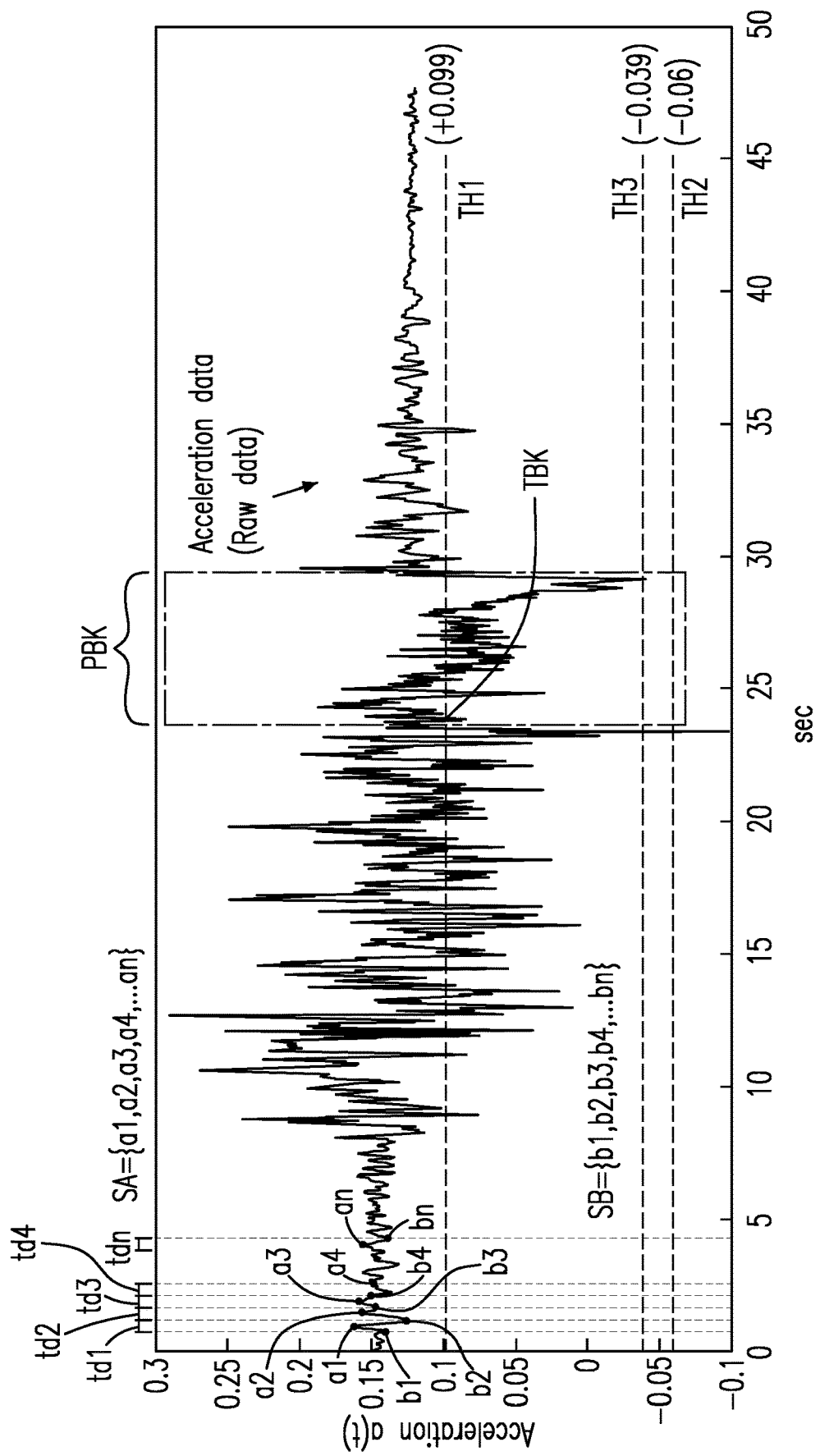
FIG. 2 is a schematic acceleration variation diagram showing an acceleration sense signal of an acceleration a(t) associated with a movable device.

Please refer to FIG. 1 and FIG. 2. FIG. 1 is a schematic diagram showing a motion system 801 according to various embodiments of the present disclosure. FIG. 2 is a schematic acceleration variation diagram showing an acceleration sense signal S1 of an acceleration a(t) associated with a movable device 22. When the movable device 22 travels with a variable acceleration B1 in a moving reference direction 22A1 on an asphalt road surface, the variable acceleration B1 is sensed to obtain the acceleration sense signal S1.

The motion system 801 includes a road surface 21, the movable device 22 moving on the road surface 21, and a warning device 23 coupled to the movable device 22. For instance, the movable device 22 is a vehicle. For instance, the vehicle is a bicycle 25. The movable device 22 has a moving reference axis 22A. The warning device 23 is disposed on the movable device 22 based on the moving reference axis 22A. The moving reference axis 22A has the moving reference direction 22A1.

In some embodiments, the movable device 22 includes a device body 221, a front wheel 222, a rear wheel 223, a seat 224, a brake unit 225, a driving structure 226 and a handling unit 227. Each of the warning device 23, the front wheel 222, the rear wheel 223, the seat 224, the brake unit 225, the driving structure 226 and the handling unit 227 is coupled to the device body 221. The handling unit 227 is configured to control the front wheel 222 and the brake unit 225. For instance, the driving structure 226 is a pedal structure. For instance, the movable device 22 includes a first rear portion 229; and the warning device 23 is disposed on the first rear portion 229 based on the moving reference axis 22A. For instance, the device body 221 includes a second rear portion 2211; and the warning device 23 is disposed on the second rear portion 2211 based on the moving reference axis 22A.

In some embodiments, the warning device 23 for the movable device 22 having the variable acceleration B1 includes a sensing unit 231, a processor 232 coupled to the sensing unit 231, and an alert unit 233 coupled to the processor 232. The sensing unit 231 includes an accelerometer 2311, and senses the variable acceleration B1 to generate an acceleration sense signal S1 by using the accelerometer 2311. The processor 232, based on the acceleration sense signal S1, decides whether to cause the alert unit 233 to output a warning signal Q1; that is, the processor 232 makes a decision R1 based on the acceleration sense signal S1. When the decision R1 is positive, the processor 232 causes the alert unit 233 to output the warning signal Q1. In FIG. 1, a data processing unit 2321 may be implemented by a software unit or a hardware unit, for example, a data processing application (not shown) or the processor 232. A motion analyzing unit 2322 may also be implemented by a software unit or a hardware unit, for example, a movement analysis application (not shown) or the processor 232. The processor 232 can obtain a plurality of acceleration data (i.e., original acceleration data (called RAW DATA)) from the acceleration sense signal S1 for subsequent analysis. The motion analyzing unit 2322 decides whether a warning sensitivity of the movable device 22 should be adjusted based on the acceleration sense signal S1, i.e., determining a decision result R2, and the processor 232 adjusts the warning sensitivity when the decision result R2 is positive.

For instance, the movable device 22 does a motion M1 having the variable acceleration B1. The road surface 21 is the asphalt road surface, and the motion M1 is a travelling motion. For instance, the motion M1 is characterized by the variable acceleration B1; and the variable acceleration B1 is represented by the acceleration sense signal S1. For instance, the accelerometer 2311 is configured to have a body coordinate system, and an X-axis sensing direction, a Y-axis sensing direction and a Z-axis sensing direction associated with the body coordinate system. The X-axis sensing direction is configured to be the same as or parallel to the moving reference direction 22A1, and is configured to be in a travelling direction HM1 of the movable device 22. For instance, the acceleration sense signal S1 is configured to represent an acceleration in the travelling direction HM1, and is expressed by a sense data.

As shown in FIG. 2, the acceleration sense signal S1 is filled with noise signals, and thus is hardly used to determine the decision result R1. Accordingly, it is necessary to improve the drawback of all frequency band noises of the acceleration sense signal S1 produced by the accelerometer 2311, wherein different frequency band noises may originate from different moving environments, different operations or different signal sampling mechanism. In FIG. 2, a time block PBK is equal to an interval after the brake unit 225 is pressed until the bicycle 25 stops, and a time point TBK is equal to a change time point which the second predetermined threshold value TH2 changes during the time block PBK.

In general, an application embodiment is relatively intuitive in that the accelerometer 2311 is used to sense the deceleration of the bicycle 25 to cause the alert unit 233 to start to emit a deceleration alert light when the bicycle 25 is travelling, wherein the alert unit 233 is an alert lamp, and includes a brake light (not shown) coupled to the processor 232. However, due to an intrinsically dynamic sensing property of a relatively wide frequency band, the accelerometer 2311 can inevitably sense an environment noise, especially a vibration signal, when sensing an acceleration/deceleration of a carrier or a vehicle. Such vibration noise can seriously influence the sensed deceleration signal of the vehicle, and thus must be definitely identified. In some embodiments, a low-pass filtering is used to eliminate the influence of this relatively-high frequency vibration noise. For instance, a low-pass filter implemented in a hardware form is used to perform the low-pass filtering. Or, a low-pass filter implemented in a software form is used to perform the low-pass filtering by using an operation method (such as a moving average algorithm AM1). The preferred embodiment in the present disclosure can carry out a band pass filter by a software unit. For instance, the band pass filter is simulated by the data processing unit 2321. In another preferred embodiment, a motion-weighted algorithm is used to determine a plurality of vibration values, and when each vibration value is relatively small, it represents that the road surface is not likely to trigger the processor 232 to cause the brake light to light up, and therefore the warning sensitivity of the brake light can be properly adjusted to make the brake light to light up more easily.

However, on smoother or less bumpy roads, noise can be filtered out in fact. If the bicycle 25 is traveling at a relatively slow speed and is in a slowly braking state, the deceleration signal of the bicycle 25 is usually weak and difficult to trigger and activate the deceleration warning light. Therefore, the present disclosure provides a motion-weighted algorithm WA1 for sampling raw acceleration data (RAW DATA), calculating a plurality of vibration values, and comparing each vibration value with a threshold value. In order to decide whether the bicycle 25 is traveling at a relatively slow speed and is in a gentle braking state, the warning sensitivity of the warning device 23 can be dynamically adjusted so that the deceleration signal of the bicycle 25 can trigger and activate the deceleration warning light more easily.

Figure 3:
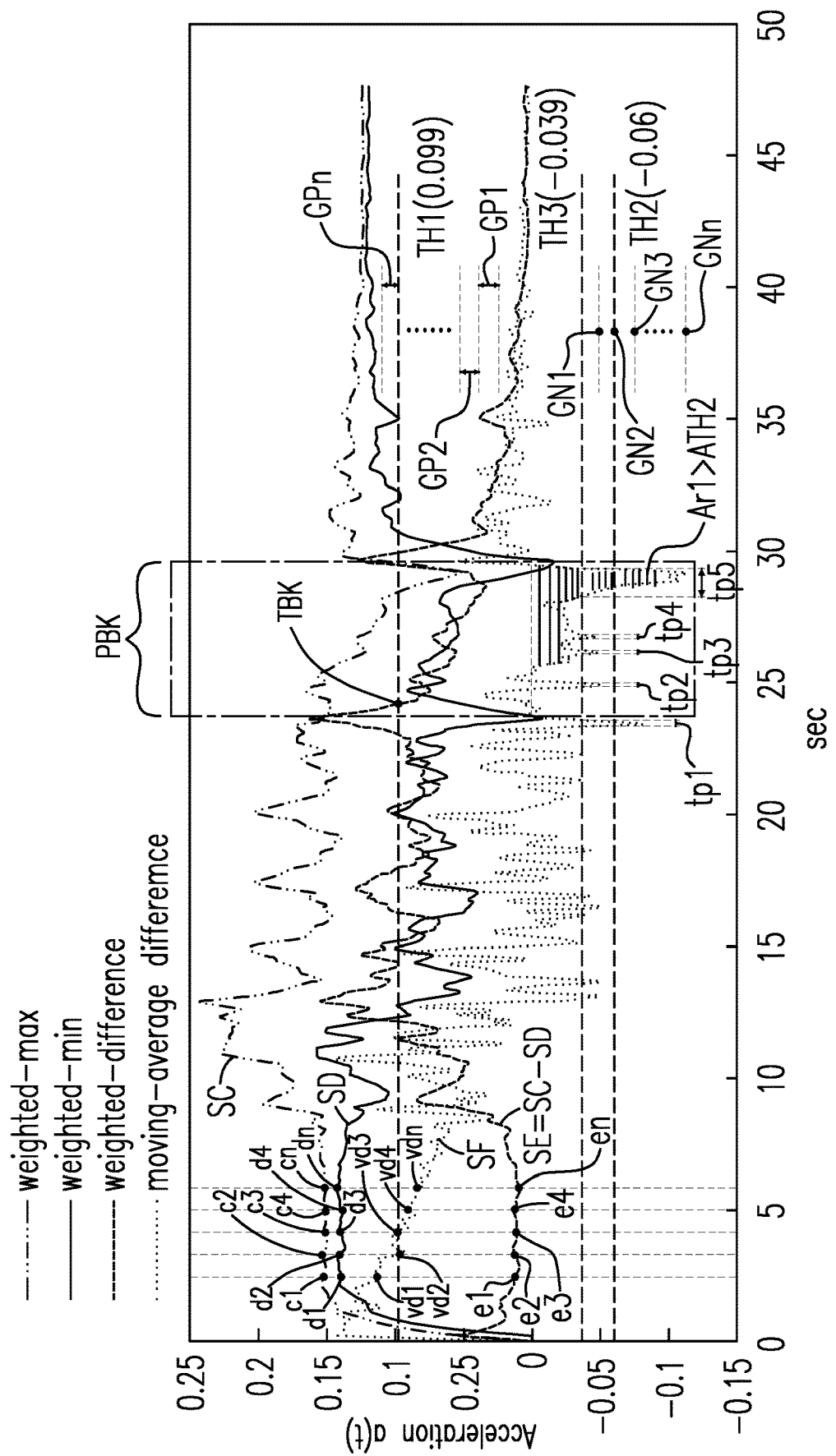
FIG. 3 is a schematic diagram illustrating the acceleration data processed by different algorithms according to a preferred embodiment of the present invention in a signal form.

Please additionally refer to FIGS. 1 and 2. The data processing unit 2321 samples a maximum acceleration value (such as one of $a1, a2, a3, a4 \ldots an$) and a minimum acceleration value (such as one of $b1, b2, b3, b4 \ldots bn$) from the plurality of acceleration data (RAW DATA) for every specific sampling interval (such as one of $td1, td2, td3, td4 \ldots tdn$), respectively forming an acceleration sequence $SA=\{a1, a2, a3, a4 \ldots an\}$ and an acceleration sequence $SB=\{b1, b2, b3, b4 \ldots bn\}$, and smoothes the acceleration sequences SA and SB based on the motion-weighted algorithm WA1. The specific sampling intervals $td1, td2, td3, td4 \ldots tdn$ are preferably the same sampling intervals, and the width of any of the specific sampling intervals $td1, td2, td3, td4 \ldots tdn$ may be also determined according to the change of the original plurality of acceleration data (RAW DATA). For example, when the change is relatively sharp, the width is decreased, and when the change is relatively gentle, the width is increased. The equal width are taken as an example. The data processing unit 2321 performs a plurality of first weighted operations on the n-th maximum acceleration value and the (n+1)th maximum acceleration value to form a plurality of maximum acceleration weighted-average values, where n is a natural number. Additionally, the data processing unit 2321 performs a plurality of second weighted operations on the n-th minimum acceleration value and the (n+1)th minimum acceleration value to form a plurality of minimum acceleration weighted-average values, where n is the natural number. For example, the plurality of maximum acceleration weighted-average values can be calculated as follows: $a1 \times 25\% + a2 \times 75\% = c1$, $a2 \times 25\% + a3 \times 75\% = c2$, $a3 \times 25\% + a4 \times 75\% = c3$, $a4 \times 25\% + a5 \times 75\% = c4$, $\ldots$ $an \times 25\% + a(n+1) \times 75\% = cn$. For example, the plurality of minimum acceleration weighted-average values can be calculated as follows: $b1 \times 25\% + b2 \times 75\% = d1$, $b2 \times 25\% + b3 \times 75\% = d2$, $b3 \times 25\% + b4 \times 75\% = d3$, $b4 \times 25\% + b5 \times 75\% = d4$, $\ldots$ $bn \times 25\% + b(n+1) \times 75\% = dn$. As shown in FIG. 3, the plurality of maximum acceleration weighted-average values $\{c1, c2, c3, c4 \ldots cn\}$ and the plurality of minimum acceleration weighted-average values $\{d1, d2, d3, d4 \ldots dn\}$ respectively form a weighted-acceleration sequence $SC=\{c1, c2, c3, c4 \ldots cn\}$ and a weighted-acceleration sequence $SD=\{d1, d2, d3, d4 \ldots dn\}$, which respectively form a first signal and a second signal. In FIG. 3, it can be seen that the acceleration sequences SA and SB have been smoothed to form the weighted acceleration sequences SC and SD obtained by the calculation of the motion-weighted algorithm. The first weighting value multiplied by the nth maximum/minimum acceleration value and the second weighting value multiplied by n+1 maximum/minimum acceleration value can be flexibly adjusted, and can be continuously tried to be optimized. In general, when the first weighting value is ranged from 0 to 50% and the second weighting value is ranged from 50% to 100%, a smoother signal can be obtained. On the contrary, when the first weighting value is ranged from 50% to 100% and the second weighting value is ranged from 0 to 50%, a steeper or sharper signal can be obtained.

Please refer to FIG. 3, which is a schematic diagram illustrating the acceleration data processed by different algorithms according to a preferred embodiment of the present invention in a signal form. The smoothed weighted acceleration sequence SC={c1, c2, c3, c4 . . . cn} and the weighted acceleration sequence SD={d1, d2, d3, d4 . . . dn} form the first signal and the second signal, respectively. A sequence SE forms a third signal, and is formed based on the difference of the plurality of weighted average values SE=SC−SD={c1−d1, c2−d2, c3−d3, c4−d4 . . . cn−dn}={e1, e2, e3, e4 . . . en}, where e1, e2, e3, e4 . . . en are the plurality of vibration values. An average acceleration sequence SF forms a fourth signal, and is formed by the data processing unit 2321 based on the moving average algorithm AM1 as follows. As shown in FIGS. 1 to 3, the data processing unit 2321 selects two different predetermined sample sizes from the plurality of acceleration data based on the moving average algorithm AM1, to generate a plurality of sample average value difference DG1. The motion analyzing unit 2322 analyzes the plurality of sample average differences DG1 to obtain a derived resultant value VA1, and compares the derived resultant value VA1 with a predetermined threshold value TH2 to generate the result R1. When the result R1 is positive, it is determined that the brake unit 225 has started to be applied. Under normal conditions, the method described above can be used to decide whether the brake unit 225 has been activated and a control signal is generated by the motion analyzing unit 2322 to make the brake light turn on.

However, under a special condition, the derived resultant value VA1 does not easily reach the predetermined threshold value TH2, and thus the brake light cannot be turned on. For example, the special condition is that the movable device 22 performs a moderate deceleration on a relatively smooth road or on a relatively less bumpy road, or the movable device 22 travels on a general asphalt road surface at a relatively slow speed, performs a gentle deceleration. In the present disclosure, by calculating each of the vibration values e1, e2, e3, e4 . . . , the predetermined threshold value TH2 is adjusted so that the derived resultant value VA1 is made easier to reach the predetermined threshold value TH2 to light up the brake light. The warning device 23 further includes a control unit. For example, the control unit is the alarm unit 233 for generating the warning signal Q1 during the deceleration. In FIG. 1, a predetermined check algorithm AE1 has a counting algorithm or an area algorithm, and is used to analyze the plurality of sample average differences DG1 to obtain the derived resultant value VA1.

In FIG. 3, the average acceleration sequence SF (or the fourth signal) includes the derived resultant value VA1 (equal to one of a plurality of derived resultant values {va1, va2, va3, va4 . . . van}) formed from the plurality of sample average value differences DG1. The method for deriving the derived resultant value VA1 is as follows: providing a moving average algorithm AM1; determining two acceleration sample data of different pre-determined sample sizes from the plurality of acceleration data based on the moving average algorithm AM1, to generate a plurality of sample average value differences DG1; analyzing the plurality of sample average value differences DG1 to obtain the derived resultant value VA1 based on a predetermined check algorithm AE1.

In some embodiments provided according to the illustration in FIG. 3, a decision whether to adjust the predetermined threshold value TH2 is added. Please refer to FIG. 1 to FIG. 3, for example, when the motion analyzing unit 2322 confirms that each of the vibration values e1, e2, e3, e4 . . . . en is not less than the first predetermined threshold TH1, the second predetermined threshold TH2 is not adjusted. For example, when the motion analyzing unit 2322 confirms that each of the vibration values e1, e2, e3, e4 . . . en is less than the first predetermined threshold value TH1, the motion analyzing unit 2322 adjusts the second predetermined threshold value TH2 to a third predetermined threshold value TH3, so that the derived resultant value VA1 can easily reach the third predetermined threshold value TH3. When the derived resultant value VA1 reaches the third predetermined threshold value TH3, the warning device 23 generates the warning signal Q1. In FIG. 3, according to the preferred embodiment of the present disclosure, the first predetermined threshold value TH1 is about equal to 0.099, the first predetermined threshold value TH2 is about equal to −0.06, and the third predetermined threshold value TH3 is about equal to −0.039.

In FIG. 2, the unit of sampling intervals for the raw acceleration data is time (second), the sampling period is approximately every several milliseconds, and then the sample acceleration data is processed by the data processing unit 2321 and is analyzed by the motion analyzing unit 2322. The processing time thereof is about several milliseconds or tens of milliseconds, depending on the processing efficiency of the warning device 23. The more efficient the warning device 23 is, the less reaction time it spends, so as to adjust the sensitivity of the warning device 23 immediately, i.e., adjusting the second predetermined threshold value TH2. In the time interval of about 0-12.5 seconds, as shown in FIG. 3, although the vibration value included in third signal (or the sequence SE) is smaller than the first predetermined threshold value TH1, the second predetermined threshold value TH2 will be immediately adjusted to the third predetermined threshold value TH3, but at this time, the derived resultant value VA1 included in fourth signal (or the sequence SF) is not smaller than the third predetermined threshold TH3, so the alert unit 233 does not generate the warning signal Q1. In the time interval of about 12.5-15.5 seconds, as shown in FIG. 3, the vibration value included in the third signal (or the sequence SE) is greater than the first predetermined threshold value TH1, so the third predetermined threshold value TH3 is immediately adjusted back to the second threshold value TH2. Although the derived resultant value VA1 included in the fourth signal (or the sequence SF) is less than the third threshold value TH3, it is not smaller than the second preset threshold value TH2 after the instant adjustment, so the alert unit 233 will not generate the warning signal Q1. It can be inferred from the same reason in the time interval of about 15.5-22.5 seconds, as shown in FIG. 3.

In FIG. 3, for the time interval tp1 near the 23th second, the derived resultant value VA1 included in the fourth signal (or the sequence SF) is smaller than the second threshold value TH2, and thus the alert unit 233 shortly generates the warning signal Q1. Then, for the time interval about between the 25th second the 30th second, starting from the timing terminal TBK, the vibration value included in the third signal (or the sequence SE) is smaller than the predetermined threshold value TH1, and thus the second predetermined threshold value TH2 is adjusted to the third predetermined threshold value TH3 to keep. During this timing block PBK, the derived resultant value VA1 is smaller than threshold value TH3, especially during several time intervals tp2, tp3, tp4, tp5, so that the alert unit 233 generates the warning signal Q1, and the warning signal Q1 is held longer especially during the time interval tp5.

In another preferred embodiment, an area algorithm may be used. The motion analyzing unit 2322 may calculate to decide whether the accumulated area during a certain time interval reaches an area threshold ATH1 (not shown) to decide whether the alert unit 233 generates the warning signal Q1. In FIG. 3, when the time point is about equal to the 13th second, the derived resultant value VA1 included in the fourth signal (or the sequence SF) starts to enter a negative value, and it can be seen that the fourth signal (or the sequence SF) has a constant periodic in the time intervals for 13-15, 15-17, 17-19, 19-21, 21-23 seconds, and the fourth signal (or the sequence SF) oscillates back and forth between positive and negative accelerations in these time intervals. This represents that the area above and below the horizontal line passing the zero-acceleration value can be almost eliminated in the same cycle of the fourth signal (or the sequence SF), and such an area algorithm is used to decide whether the movable device 22 is in a braking state. From the range of 26-29 seconds of the fourth signal (or the sequence SF), it can be seen that the lower area Ar1 enclosed by the fourth signal (or the sequence SF) and the horizontal line is not cancelled. At this time, the area threshold ATH1 can be dynamically adjusted to the area threshold ATH2, which makes the motion analyzing unit 2322 to easily decide that the lower area Ar1 is greater than the area threshold ATH2, so that the alert unit 233 generates the warning signal Q1, that is, ATH1>Ar1>ATH2.

In another preferred embodiment, when the vibration value included in the third signal (or the sequence SE) is larger than the first predetermined threshold value TH1, the derived resultant value VA1 included in the fourth signal (or the sequence SF) is smaller than the second threshold TH2, and the area Ar1 enclosed by the fourth signal (or the sequence SF) and the horizontal line is greater than the area threshold ATH1, the alert unit 233 generates the warning signal Q1. When the vibration value included in the third signal (or by the sequence SE) is smaller than the first predetermined threshold TH1, the second threshold TH2 will be adjusted to the third threshold TH3, and the area threshold ATH1 will be adjusted to the area threshold ATH2, so that ATH1>Ar1>ATH2. In this case, when the derived resultant value VA1 included in the fourth signal (or the sequence SF) is smaller than the third threshold TH3, and the lower area Ar1 enclosed by the fourth signal (or the sequence SF) and the horizontal area is greater than the area threshold ATH2, the motion analyzing unit 2322 makes the alert unit 233 to generate this warning signal Q1.

Figure 4:
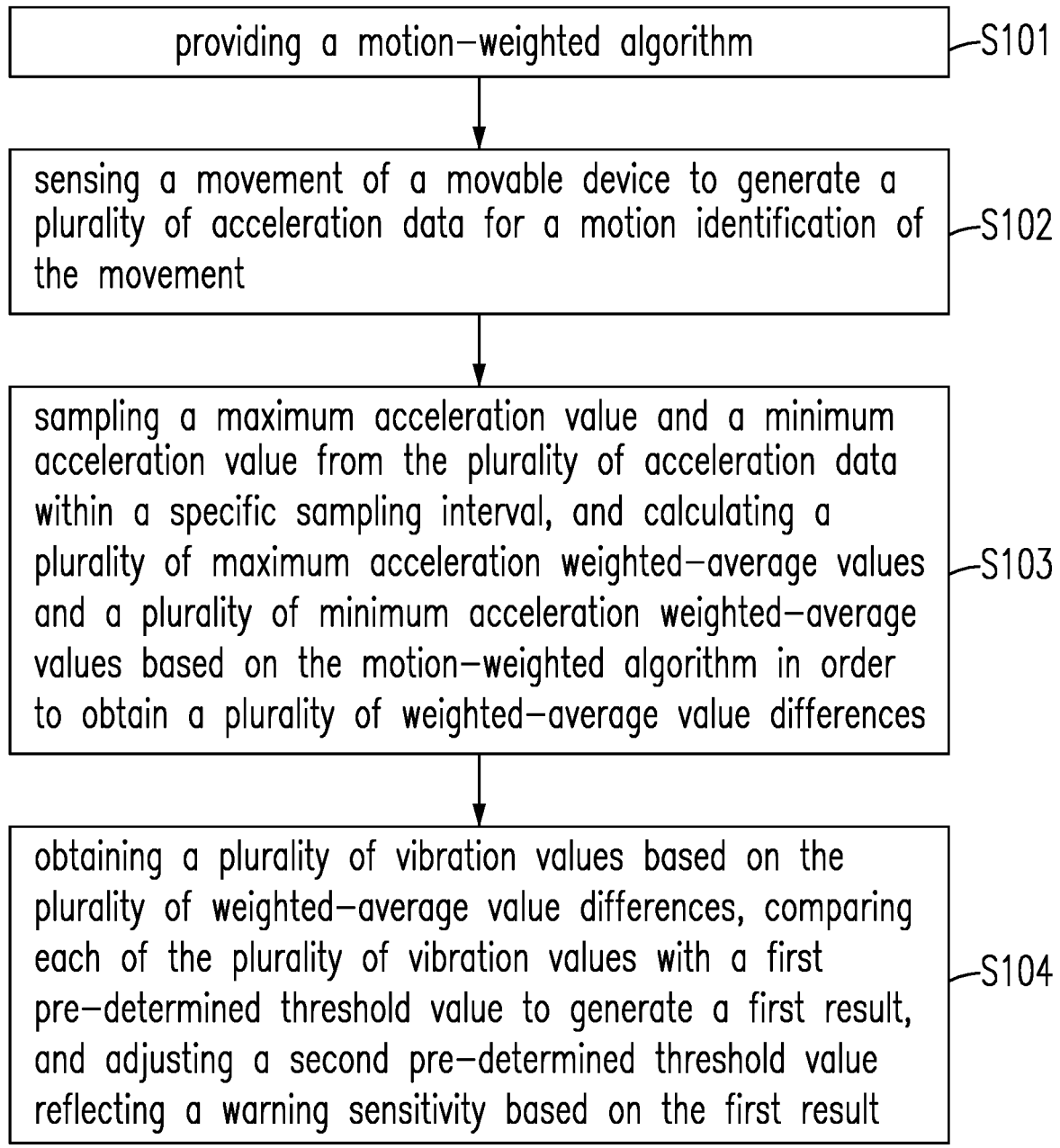
FIG. 4 is a schematic diagram showing a method for adjusting a warning sensitivity of a movable device having a movement according to the preferred embodiment of the present disclosure.

Please refer to FIG. 4, which is a schematic diagram showing a method S10 for adjusting a warning sensitivity of a movable device having a movement according to the preferred embodiment of the present disclosure. The method S10 includes steps of: step S101, providing a motion-weighted algorithm; step S102, sensing the movement of the movable device to generate a plurality of acceleration data for a motion identification of the movement; step S103, sampling a maximum acceleration value and a minimum acceleration value from the plurality of acceleration data within a specific sampling interval, and calculating a plurality of maximum acceleration weighted-average values and a plurality of minimum acceleration weighted-average values based on the motion-weighted algorithm in order to obtain a plurality of weighted-average value differences; and step S104, obtaining a plurality of vibration values based on the plurality of weighted-average value differences, comparing each of the plurality of vibration values with a first pre-determined threshold value to generate a first result, and adjusting a second pre-determined threshold value reflecting the warning sensitivity based on the first result.

Figure 5:
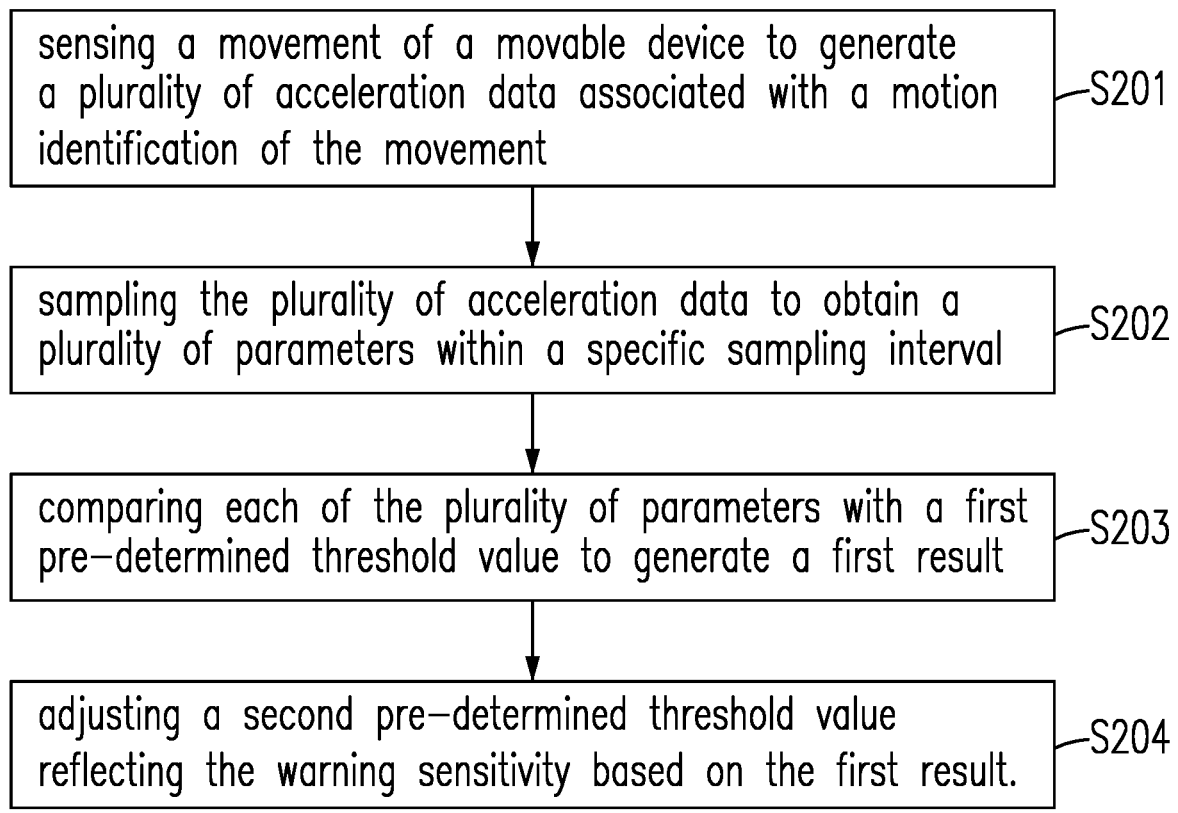
FIG. 5 is a schematic diagram showing another method for adjusting a warning sensitivity of a movable device having a movement according to the preferred embodiment of the present disclosure.

Please refer to FIG. 5, which is a schematic diagram showing another method S20 for adjusting a warning sensitivity of a movable device having a movement according to the preferred embodiment of the present disclosure. The method S20 includes steps of: step S201, sensing a movement of a movable device to generate a plurality of acceleration data associated with a motion identification of the movement; step S202, sampling the plurality of acceleration data to obtain a plurality of parameters within a specific sampling interval; step S203, comparing each of the plurality of parameters with a first pre-determined threshold value to generate a first result; and step S204, adjusting a second pre-determined threshold value reflecting the warning sensitivity based on the first result.

In some embodiments of the present disclosure, the first pre-determined threshold value is used to decide whether the warning sensitivity should be adjusted during the specific interval. Each of the plurality of parameters is a vibration value.

Please refer to FIG. 3 again. In another preferred embodiment of the present disclosure, the motion analyzing unit 2322 can adjust the second predetermined threshold value TH2 to the corresponding third predetermined threshold value TH3 according to the vibration value e1 at a first timing point among different threshold value ranges GP1, GP2, GP3 . . . GPn. For instance, when the movable device 22 travels along different kinds of road surfaces including steep slopes, down hills, planes and gravel roads, the motion analyzing unit 2322 adjusts the predetermined threshold value TH2 to the corresponding third predetermined threshold value (such as one of GN1, GN2, GN3 . . . GNn) according to a decision which range the vibration value e1 is located at. In other words, the motion analyzing unit 2322 adjusts the sensitivity of the warning device 23 in real time according to different road surfaces which the movable device 22 travels along.

EMBODIMENTS

1. A warning device for adjusting a warning sensitivity of a movable device having a movement comprises a sensing unit, a data processing unit and a motion analyzing unit. The sensing unit senses the movement of the moveable device to generate a plurality of acceleration data associated with a motion identification of the movement. The data processing unit is electrically connected to the sensing unit, and samples the plurality of acceleration data to obtain a plurality of parameters within a specific sampling interval. The motion analyzing unit is electrically connected to the data processing unit, compares each of the plurality of parameters with a first pre-determined threshold value to generate a first result, and adjusts a second pre-determined threshold value reflecting the warning sensitivity based on the first result.

2. The warning device in Embodiment 1, wherein the sensing unit includes an accelerometer and senses a variable acceleration of the movable device to generate the plurality of acceleration data; and the movable device slowly decelerates on one of a relatively smooth road-surface and a relatively non jolting road-surface.

3. The warning device of any one of Embodiments 1-2, wherein the data processing unit includes a first processor, identifies a pair of a maximum acceleration value and a minimum acceleration value from the plurality of acceleration data within the specific sampling interval, and obtains a plurality of maximum acceleration weighted-average values and a corresponding plurality of minimum acceleration weighted-average values; and the data processing unit subtracts each of the plurality of minimum acceleration weighted-average values from the corresponding each of the plurality of maximum acceleration weighted-average values to obtain a plurality of weighted-average value differences.

4. The warning device of any one of Embodiments 1-3, wherein the motion analyzing unit includes a second processor; and the motion analyzing unit acquires a plurality of vibration values based on each of the plurality of weighted-average value differences.

5. The warning device of any one of Embodiments 1-4, wherein the first result includes one of a condition that: the motion analyzing unit adjusts the second pre-determined threshold value to a third pre-determined threshold value when the motion analyzing unit determines a respective one of the plurality of vibration values is less than the first pre-determined threshold value during the specific sampling interval; and the motion analyzing unit does not adjust the second pre-determined threshold value when the motion analyzing unit determines the respective one of the plurality of vibration values is not less than the first pre-determined threshold value during the specific sampling interval.

6. The warning device of any one of Embodiments 1-5, wherein the movable device decelerates at a relatively slow rate on a normal asphalt road; the data processing unit simulates a band pass filter; and the data processing unit is configured to use a motion-weighted algorithm, applying a plurality of first weighted operations to an nth maximum acceleration value and an (n+1)th maximum acceleration value to form the plurality of maximum acceleration weighted-average values, and applying a plurality of second weighted operations to an nth minimum acceleration value and an (n+1)th minimum acceleration value to form the plurality of minimum acceleration weighted-average values, where n is a natural number.

7. The warning device of any one of Embodiments 1-6, wherein the data processing unit further uses a moving average algorithm; the data processing unit determines two acceleration sample data of different pre-determined sample sizes from the plurality of acceleration data based on the moving average algorithm, to generate a plurality of sample average value differences; the motion analyzing unit analyzes the plurality of sample average value differences to obtain a derived resultant value compared with the second pre-determined threshold value to generate a second result based on a pre-determined check algorithm, when the derived resultant value does not reach the second pre-determined threshold value; and the motion analyzing unit adjusts the second pre-determined threshold value to a third pre-determined threshold value when the motion analyzing unit determines a respective one of the plurality of vibration values is smaller than the first pre-determined threshold value during the specific sampling interval, so as to allow the derived resultant value to easily reach the third pre-determined threshold value.

8. The warning device of any one of Embodiments 1-7, wherein the warning device further includes a control unit configured to generate a warning signal while the moveable device is slowly decelerated; the warning device generates the warning signal when the derived resultant value reaches the third pre-determined threshold value; and the pre-determined check algorithm has one of a counting algorithm and an area algorithm for analyzing the plurality of sample average value differences to obtain the derived resultant value.

9. A method for adjusting a warning sensitivity of a movable device having a movement, comprising steps of: providing a motion-weighted algorithm; sensing the movement of the movable device to generate a plurality of acceleration data for a motion identification of the movement; sampling a maximum acceleration value and a minimum acceleration value from the plurality of acceleration data within a specific sampling interval, and calculating a plurality of maximum acceleration weighted-average values and a plurality of minimum acceleration weighted-average values based on the motion-weighted algorithm in order to obtain a plurality of weighted-average value differences; and obtaining a plurality of vibration values based on the plurality of weighted-average value differences, comparing each of the plurality of vibration values with a first pre-determined threshold value to generate a first result, and adjusting a second pre-determined threshold value reflecting the warning sensitivity based on the first result.

10. The method in Embodiment 9, further comprising the following steps of: applying a plurality of first weighted operations to an nth maximum acceleration value and an (n+1)th maximum acceleration value to obtain a plurality of maximum acceleration weighted-average values; applying a plurality of second weighted operations to an nth minimum acceleration value and an (n+1)th minimum acceleration value to obtain a plurality of minimum acceleration weighted-average values, where n is a natural number, and the specific sampling interval is a time sampling duration; and subtracting each of the plurality of minimum acceleration weighted-average values from the corresponding maximum acceleration weighted-average values to obtain a plurality of weighted-average value differences for forming a plurality of vibration values.

11. The method of any one of Embodiments 9-10, further comprising the following steps of: providing a moving average algorithm; determining two acceleration sample data of different pre-determined sample sizes from the plurality of acceleration data based on the moving average algorithm, to generate a plurality of sample average value differences; analyzing the plurality of sample average value differences to obtain a derived resultant value compared with the second pre-determined threshold value to generate a second result based on a pre-determined check algorithm, when the derived resultant value does not reach the second pre-determined threshold; adjusting the second pre-determined threshold value to a third pre-determined threshold value when each of the plurality of vibration values is determined to be less than the first pre-determined threshold value during the specific sampling interval, so as to allow the derived resultant value to easily reach the third pre-determined threshold value; and generating a warning signal when the derived resultant value achieves the third pre-determined threshold value.

12. The method of any one of Embodiments 9-11, wherein the first result includes one of a condition that: adjusting the second pre-determined threshold value to a third pre-determined threshold value when each of the plurality of vibration values is determined to be less than the first pre-determined threshold value during the specific sampling interval; and keeping the second pre-determined threshold value when each of the plurality of vibration values is determined to be not less than the first pre-determined threshold value during the specific sampling interval.

13. The method of any one of Embodiments 9-12, wherein the pre-determined check algorithm has one of a counting algorithm and an area algorithm for analyzing the plurality of sample average value differences to obtain the derived resultant value.

14. A method for adjusting a warning sensitivity of a movable device having a movement, comprising steps of: sensing the movement of the movable device to generate a plurality of acceleration data associated with a motion identification of the movement; sampling the plurality of acceleration data to obtain a plurality of parameters within a specific sampling interval; comparing each of the plurality of parameters with a first pre-determined threshold value to generate a first result; and adjusting a second pre-determined threshold value reflecting the warning sensitivity based on the first result.

15. The method in Embodiment 14, further comprising steps of: providing a moving average algorithm; determining two acceleration sample data of different pre-determined sample sizes from the plurality of acceleration data based on the moving average algorithm, to generate a plurality of sample average value differences; analyzing the plurality of sample average value differences to obtain a derived resultant value; comparing the derived resultant value with the second pre-determined threshold value to generate a second result, when the derived resultant value does not reach the second pre-determined threshold value; adjusting the second pre-determined threshold value to a third pre-determined threshold value when each of the plurality of vibration values is determined to be less than the first pre-determined threshold value during the specific sampling interval, so as to allow the derived resultant value to easily reach the third pre-determined threshold value; and generating a warning signal when the derived resultant value achieves the third pre-determined threshold value.

16. The method of any one of Embodiments 14-15, wherein the second pre-determined threshold value is used to determine whether the warning sensitivity should be adjusted during the specific interval; and each of the plurality of parameters is a vibration value.

17. The method of any one of Embodiments 14-16, further using a movement-weighted algorithm comprising the following steps of: determining a maximum acceleration value and a minimum acceleration value from the plurality of acceleration data within a specific sampling interval, and forming a plurality of maximum acceleration weighted-average values and a plurality of minimum acceleration weighted-average values respectively, in order to obtain a plurality of weighted-average value differences; applying a plurality of first weighted operations to an nth maximum acceleration value and an (n+1)th maximum acceleration value to obtain a plurality of maximum acceleration weighted-average values; and applying a plurality of second weighted operations to an nth minimum acceleration value and an (n+1)th minimum acceleration value to obtain a plurality of minimum acceleration weighted-average values, where n is a natural number, and the specific sampling interval is a time sampling duration.

18. The method of any one of Embodiments 14-17, wherein the movement-weighted algorithm suppresses a relative strong vibration resulting from the plurality of maximum acceleration weighted-average values and the plurality of minimum acceleration weighted-average values.

19. The method of any one of Embodiments 14-18, further comprising a step of: subtracting each of the plurality of minimum acceleration weighted-average values from the corresponding maximum acceleration weighted-average values to obtain a plurality of weighted-average value differences for forming a plurality of vibration values.

20. The method of any one of Embodiments 14-19, wherein the motion identification of the movement includes an identification that the movable device is slowly decelerating; and the first result includes one of a condition that: adjusting the second pre-determined threshold value to a third pre-determined threshold value while determining each of the plurality of vibration values is less than the first pre-determined threshold value during the specific sampling interval; and keeping the second pre-determined threshold value while determining each of the plurality of vibration values is not less than the first pre-determined threshold value during the specific sampling interval.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A warning device for adjusting a warning sensitivity of a movable device having a movement, comprising:
   a sensing unit sensing the movement of the moveable device to generate a plurality of acceleration data associated with a motion identification of the movement;
   a data processing unit electrically connected to the sensing unit, and sampling the plurality of acceleration data to obtain a plurality of maximum acceleration weighted-average values and a plurality of minimum acceleration weighted-average values, a plurality of weighted-average value differences and a plurality of parameters within a specific sampling interval, wherein each of the plurality of parameters is a vibration value; and
   a motion analyzing unit electrically connected to the data processing unit, acquiring the plurality of parameters and comparing each of the plurality of parameters with a first pre-determined threshold value to generate a first result, and adjusting a second pre-determined threshold value reflecting the warning sensitivity based on the first result.

2. The warning device as claimed in claim 1, wherein:
   the sensing unit includes an accelerometer and senses a variable acceleration of the movable device to generate the plurality of acceleration data; and
   the movable device slowly decelerates on one of a relatively smooth road-surface and a relatively non-jolting road-surface.

3. The warning device as claimed in claim 1, wherein:
   the data processing unit includes a first processor, and identifies a pair of a maximum acceleration value and a minimum acceleration value from the plurality of acceleration data within the specific sampling interval, and obtains a plurality of maximum acceleration weighted-average values and a corresponding plurality of minimum acceleration weighted average values; and
   the data processing unit subtracts each of the plurality of minimum acceleration weighted-average values from the corresponding each of the plurality of maximum acceleration weighted-average values to obtain the plurality of weighted-average value differences.

4. The warning device as claimed in claim 3, wherein:
   the motion analyzing unit includes a second processor; and the motion analyzing unit acquires the plurality of vibration values parameters based on each of the plurality of weighted-average value differences.

5. The warning device as claimed in claim 3, wherein:
the first result includes one of a condition that:
the motion analyzing unit adjusts the second pre-determined threshold value to a third pre-determined threshold value when the motion analyzing unit determines a respective one of the plurality of vibration values is less than the first pre-determined threshold value during the specific sampling interval; and
the motion analyzing unit does not adjust the second pre-determined threshold value when the motion analyzing unit determines the respective one of the plurality of vibration values is not less than the first pre-determined threshold value during the specific sampling interval.

6. The warning device as claimed in claim 3, wherein:
the movable device decelerates at a relatively slow rate on a normal asphalt road;
the data processing unit simulates a band pass filter; and
the data processing unit is configured to use a motion-weighted algorithm, applying a plurality of first weighted operations to nth maximum acceleration value and an (n+1)th maximum acceleration value to form the plurality of maximum acceleration weighted-average values, and applying a plurality of second weighted operations to an nth minimum acceleration value and an (n+1)th minimum acceleration value to form the plurality of minimum acceleration weighted-average values, where n is a natural number.

7. The warning device as claimed in claim 1, wherein:
the data processing unit further uses a moving average algorithm;
the data processing unit determines two acceleration sample data of different pre-determined sample sizes from the plurality of acceleration data based on the moving average algorithm, to generate a plurality of sample average value differences;
the motion analyzing unit analyzes the plurality of sample average value differences to obtain a derived resultant value compared with the second pre-determined threshold value to generate a second result based on a pre-determined check algorithm, when the derived resultant value does not reach the second pre-determined threshold value; and
the motion analyzing unit adjusts the second pre-determined threshold value to a third pre-determined threshold value when the motion analyzing unit determines a respective one of the plurality of vibration values is smaller than the first pre-determined threshold value during the specific sampling interval, so as to allow the derived resultant value to easily reach the third pre-determined threshold value.

8. The warning device as claimed in claim 7, wherein:
the warning device further includes a control unit configured to generate a warning signal while the moveable device is slowly decelerated;
the warning device generates the warning signal when the derived resultant value reaches the third pre-determined threshold value; and
the pre-determined check algorithm has one of a counting algorithm and an area algorithm for analyzing the plurality of sample average value differences to obtain the derived resultant value.

9. A method for adjusting a warning sensitivity of a movable device having a movement, comprising steps of:
providing a motion-weighted algorithm;
sensing the movement of the movable device to generate a plurality of acceleration data for a motion identification of the movement;
sampling a maximum acceleration value and a minimum acceleration value from the plurality of acceleration data within a specific sampling interval, and calculating a plurality of maximum acceleration weighted-average values and a plurality of minimum acceleration weighted-average values based on the motion-weighted algorithm in order to obtain a plurality of weighted-average value differences; and
obtaining a plurality of vibration values based on the plurality of weighted-average value differences, comparing each of the plurality of vibration values with a first pre-determined threshold value to generate a first result, and adjusting a second pre-determined threshold value reflecting the warning sensitivity based on the first result.

10. The method as claimed in claim 9, further comprising the following steps of:
applying a plurality of first weighted operations to an nth maximum acceleration value and an (n+1)th maximum acceleration value to obtain a plurality of maximum acceleration weighted-average values;
applying a plurality of second weighted operations to an nth minimum acceleration value and an (n+1)th minimum acceleration value to obtain a plurality of minimum acceleration weighted-average values, where n is a natural number, and the specific sampling interval is a time sampling duration; and
subtracting each of the plurality of minimum acceleration weighted-average values from the corresponding maximum acceleration weighted-average values to obtain a plurality of weighted-average value differences for forming a plurality of vibration values.

11. The method as claimed in claim 9, further comprising the following steps of:
providing a moving average algorithm;
determining two acceleration sample data of different pre-determined sample sizes from the plurality of acceleration data based on the moving average algorithm, to generate a plurality of sample average value differences;
analyzing the plurality of sample average value differences to obtain a derived resultant value compared with the second pre-determined threshold value to generate a second result based on a pre-determined check algorithm, when the derived resultant value does not reach the second pre-determined threshold;
adjusting the second pre-determined threshold value to a third pre-determined threshold value when each of the plurality of vibration values is determined to be less than the first pre-determined threshold value during the specific sampling interval, so as to allow the derived resultant value to easily reach the third pre-determined threshold value; and
generating a warning signal when the derived resultant value achieves the third pre-determined threshold value.

12. The method as claimed in claim 11, wherein the pre-determined check algorithm has one of a counting algorithm and an area algorithm for analyzing the plurality of sample average value differences to obtain the derived resultant value.

13. The method as claimed in claim 9, wherein:
the first result includes one of a condition that:
adjusting the second pre-determined threshold value to a third pre-determined threshold value when each of the plurality of vibration values is determined to be less than the first pre-determined threshold value during the specific sampling interval; and
keeping the second pre-determined threshold value when each of the plurality of vibration values is determined to be not less than the first pre-determined threshold value during the specific sampling interval.

14. A method for adjusting a warning sensitivity of a movable device having a movement, comprising steps of:
sensing the movement of the movable device to generate a plurality of acceleration data associated with a motion identification of the movement;
sampling the plurality of acceleration data to obtain a plurality of parameters within a specific sampling interval;
applying a movement-weighted algorithm,
to form a plurality of maximum acceleration weighted-average values and a plurality of minimum acceleration weighted-average values respectively in order to obtain a plurality of weighted-average value differences to form a plurality of parameters;
comparing each of the plurality of parameters with a first pre-determined threshold value to generate a first result; and
adjusting a second pre-determined threshold value reflecting the warning sensitivity based on the first result.

15. The method as claimed in claim 14, further comprising steps of:
providing a moving average algorithm;
determining two acceleration sample data of different pre-determined sample sizes from the plurality of acceleration data based on the moving average algorithm, to generate a plurality of sample average value differences;
analyzing the plurality of sample average value differences to obtain a derived resultant value;
comparing the derived resultant value with the second pre-determined threshold value to generate a second result, when the derived resultant value does not reach the second pre-determined threshold value;
adjusting the second pre-determined threshold value to a third pre-determined threshold value when each of the plurality of vibration values is determined to be less than the first pre-determined threshold value during the specific sampling interval, so as to allow the derived resultant value to easily reach the third pre-determined threshold value; and
generating a warning signal when the derived resultant value achieves the third pre-determined threshold value.

16. The method as claimed in claim 14, wherein:
the first pre-determined threshold value is used to determine whether the warning sensitivity should be adjusted during the specific interval; and
each of the plurality of parameters is a vibration value.

17. The method as claimed in claim 16, wherein the plurality of weighted-average value differences for forming the plurality of vibration values are obtained by
subtracting each of the plurality of minimum acceleration weighted-average values from the corresponding maximum acceleration weighted-average values.

18. The method as claimed in claim 14, wherein the movement-weighted algorithm further comprising the following steps of:
determining a maximum acceleration value and a minimum acceleration value from the plurality of acceleration data within a specific sampling interval;
applying a plurality of first weighted operations to an nth maximum acceleration value and an (n+1)th maximum acceleration value to obtain the plurality of maximum acceleration weighted-average values; and
applying a plurality of second weighted operations to an nth minimum acceleration value and an (n+1)th minimum acceleration value to obtain the plurality of minimum acceleration weighted-average values, where n is a natural number, and the specific sampling interval is a time sampling duration.

19. The method as claimed in claim 18, wherein the movement-weighted algorithm suppresses a relative strong vibration resulting from the plurality of maximum acceleration weighted-average values and the plurality of minimum acceleration weighted-average values.

20. The method as claimed in claim 14, wherein:
the motion identification of the movement includes an identification that the movable device is slowly deceleration; and
the first result includes one of a condition that:
adjusting the second pre-determined threshold value to a third pre-determined threshold value while determining each of the plurality of vibration values is less than the first pre-determined threshold value during the specific sampling interval; and
keeping the second pre-determined threshold value while determining each of the plurality of vibration values is not less than the first pre-determined threshold value during the specific sampling interval.

* * * * *